US009423524B2

(12) United States Patent
Fang

(10) Patent No.: US 9,423,524 B2
(45) Date of Patent: Aug. 23, 2016

(54) OIL-BASED MUD IMAGER WITH A LINE SOURCE

(75) Inventor: Sheng Fang, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 589 days.

(21) Appl. No.: 13/079,948

(22) Filed: Apr. 5, 2011

(65) Prior Publication Data
US 2011/0248717 A1 Oct. 13, 2011

Related U.S. Application Data

(60) Provisional application No. 61/321,554, filed on Apr. 7, 2010.

(51) Int. Cl.
G01V 3/00 (2006.01)
G01V 3/24 (2006.01)

(52) U.S. Cl.
CPC .......................................... G01V 3/24 (2013.01)

(58) Field of Classification Search
CPC .............................................. G01V 3/18–3/24
USPC .......................................................... 324/355
See application file for complete search history.

(56) References Cited

U.S. PATENT DOCUMENTS 3,007,107 A * 10/1961 Gondouin ..................... 324/359
5,008,625 A     4/1991 Chen
5,036,283 A     7/1991 Trouiller et al.
5,942,990 A *  8/1999 Smith ................... E21B 47/122
                                                                    166/64
6,173,793 B1    1/2001 Thompson
6,359,438 B1 *  3/2002 Bittar ............................ 324/369
6,515,592 B1 *  2/2003 Babour et al. ............. 340/854.4
6,603,314 B1 *  8/2003 Kostelnicek et al. ......... 324/368
6,801,039 B2 * 10/2004 Fabris et al. .................. 324/324
6,809,521 B2 * 10/2004 Tabarovsky et al. .......... 324/374
7,034,538 B2 *  4/2006 Strack et al. .................. 324/347
7,066,282 B2 *  6/2006 Chen et al. ....................... 175/50
7,119,544 B2 * 10/2006 Hayman et al. ............... 324/374
7,242,174 B1    7/2007 Sheu et al.
7,365,454 B2    4/2008 Morrow
7,388,382 B2 *  6/2008 Strack et al. .................. 324/368
7,397,250 B2    7/2008 Bespalov et al.
7,414,407 B2    8/2008 Wang et al.
7,588,080 B2 *  9/2009 McCoy .................... 166/250.01
7,839,149 B2   11/2010 Wang et al.
2002/0153897 A1 * 10/2002 Evans et al. ................... 324/374
2003/0197510 A1 * 10/2003 Gianzero et al. .............. 324/367
2006/0186888 A1    8/2006 Wang et al.
2007/0103161 A1 *  5/2007 San Martin et al. .......... 324/366
2007/0103162 A1 *  5/2007 Morys et al. .................. 324/367
2007/0236222 A1 * 10/2007 Gorek et al. .................. 324/356
2007/0257677 A1 * 11/2007 Wang ............................ 324/347

(Continued)

FOREIGN PATENT DOCUMENTS

EP     0 540 425 A2   5/1993

OTHER PUBLICATIONS

Search Report in GB1218229.1, dtd Aug. 20, 2015.

Primary Examiner — Patrick Assouad
Assistant Examiner — Demetrius Pretlow
(74) Attorney, Agent, or Firm — Mossman Kumar & Tyler PC

(57) ABSTRACT

A resistivity imaging device uses a line source in conjunction with an array of measure electrodes to reduce sensitivity to tool standoff when use in a borehole with oil-based mud.

12 Claims, 6 Drawing Sheets

(56) References Cited

U.S. PATENT DOCUMENTS

| | | |
|---|---|---|
| 2008/0068025 A1* | 3/2008 | Gold et al. .................... 324/367 |
| 2008/0093922 A1* | 4/2008 | Layton ............................ 307/3 |
| 2008/0278171 A1* | 11/2008 | Itskovich et al. ............. 324/355 |
| 2008/0297161 A1* | 12/2008 | Gorek .......................... 324/342 |
| 2009/0179647 A1 | 7/2009 | Wang et al. |
| 2009/0295393 A1 | 12/2009 | Bespalov et al. |
| 2009/0309591 A1* | 12/2009 | Goodman et al. ............ 324/303 |
| 2010/0176812 A1* | 7/2010 | Bittar ....................... G01V 3/24 324/339 |

\* cited by examiner

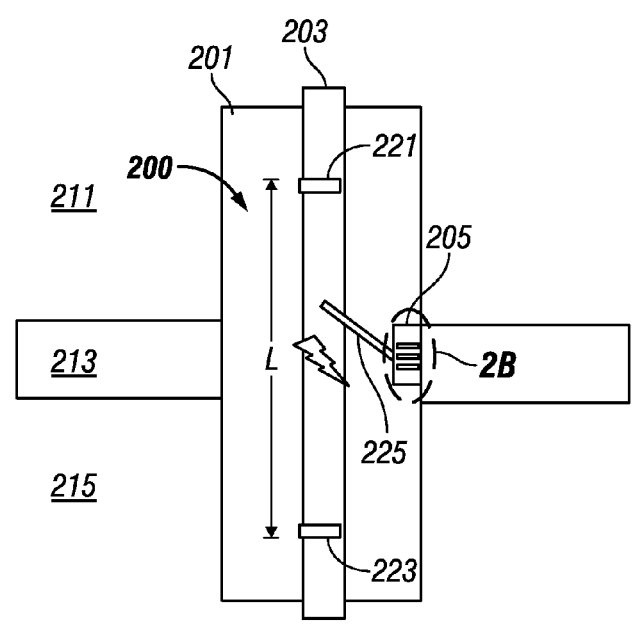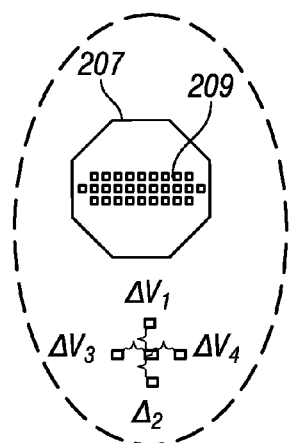
FIG. 2A
FIG. 2B

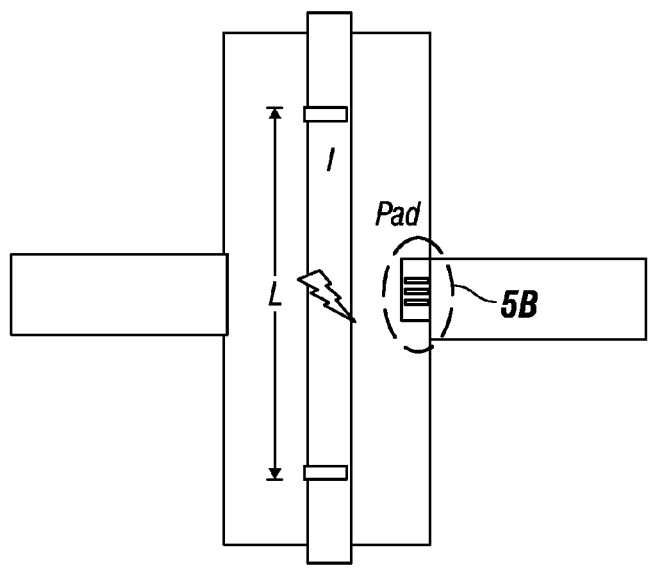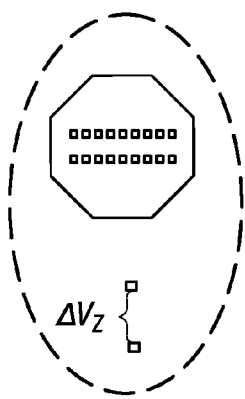
FIG. 5B
FIG. 5A

120

OIL-BASED MUD IMAGER WITH A LINE SOURCE

CROSS-REFERENCES TO RELATED APPLICATIONS

This application claims priority from U.S. provisional patent application Ser. No. 61/321,554 filed on Apr. 7, 2010.

BACKGROUND OF THE DISCLOSURE

1. Field of the Disclosure

The disclosed disclosure is related to downhole well investigation methods and, in particular, to measuring a resistivity property of an earth formation from a borehole containing non-conductive mud.

2. Description of the Related Art

A big challenge in oil-based mud imaging tools using electrodes is to reduce or correct the standoff effects. This is due to the fact that changes in tool standoff from the borehole wall produce variations in the current in the electrodes that mask any current variation in the formation being measured. When the standoff is large, current flow between the electrodes also become important. Capacitive coupling has been used for conveying currents into the formation, but at the high frequencies needed for capacitive coupling, the capacitance between the electrodes becomes a serious problem.

The present disclosure addresses this problem using a line source for conveying current into the formation.

SUMMARY OF THE DISCLOSURE

One embodiment of the present disclosure is an apparatus configured to evaluate an earth formation. The apparatus includes: a carrier including a line source of electric current configured to be conveyed in a borehole; and at least one pair of electrodes proximate to a wall of the borehole, a difference in potential between a first one of the at least one pair of electrodes and a second one of the at least one pair of electrodes being indicative of a resistivity property of the earth formation.

Another embodiment of the disclosure is a method of evaluating an earth formation. The method includes: activating a line source of electric current conveyed on a carrier in a borehole; providing a first signal from a first one of at least one pair of electrodes proximate to a wall of the borehole indicative of a potential of the first one of the electrodes and a second signal from a second one of the at least one pair of electrodes indicative of a potential of the second one of the electrodes; and using a processor for estimating a resistivity property of the earth formation using the first signal and the second signal.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein:

FIG. 2a shows a detail of one embodiment of the present imaging tool suspended in a borehole;

FIG. 2b shows a detail of a pad of the imaging tool;

FIG. 3b shows a detail of a pad of the imaging tool of FIG. 3a;

FIGS. 5a-5b show an embodiment of the disclosure wherein only vertical measurements are made.

DETAILED DESCRIPTION OF THE DISCLOSURE

Figure 1:
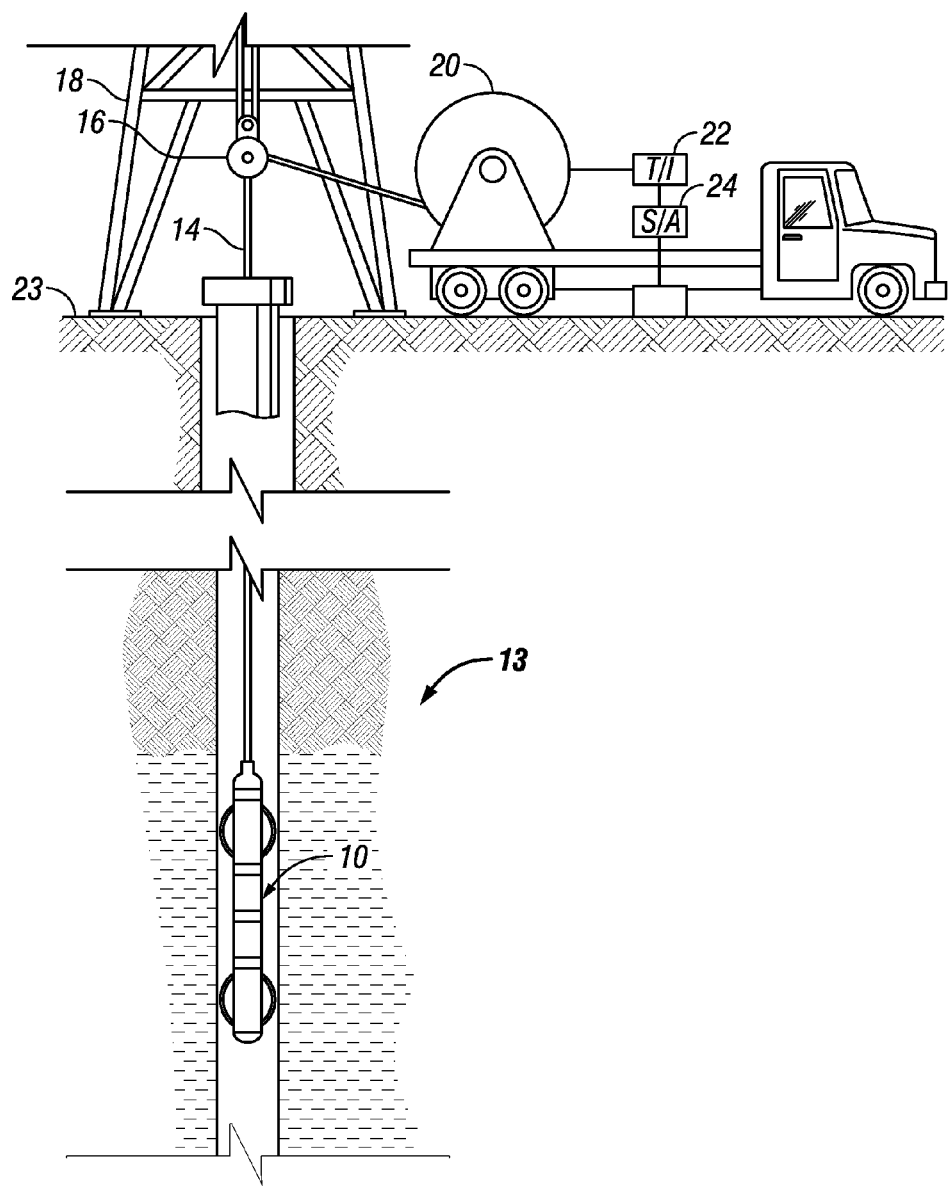
FIG. 1 shows an exemplary imaging tool suitable for use with this disclosure suspended in a borehole.

FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some of the data processing may also be done by a downhole computer. Novel aspects of the imaging tool of the present disclosure are discussed next.

FIG. 2a shows an exemplary imaging tool 200 of the present disclosure disposed in a borehole 201. Three intervals of the formation 211, 213 and 215 are shown. The logging tool 200 includes a conductive member 203 that is shown with two toroidal coils 221, 223 spaced a distance 'L' apart. For an MWD implementation, the conductive member may be a drill pipe while for a wireline implementation, the conductive member may be a metal rod inside a non-conducting mandrel. For the purposes of the present disclosure, the logging tool 200 may be referred to as a carrier. The term "carrier" is also intended to include a bottomhole assembly conveyed on a drilling tubular for MWD implementation.

A sensor pad 207 shown in FIG. 2b is positioned in proximity to a wall of the borehole. For the present disclosure, the term "proximate" includes "in contact with" as well as "close to." The term "close to" in the context of the present disclosure is intended to mean that the sensor pad 207 is close enough to make measurements of formation resistivity as discussed further below. The sensor pad may be referred to as a contact member and includes an array of electrodes 209. The array of electrodes may be a two-dimensional array as shown in FIG. 2b. The sensor pad is coupled to the carrier by a coupling member such as extension rod 225.

Of interest are potential differences indicated by $\Delta V_1$, $\Delta V_2$, $\Delta V_3$ and $\Delta V_4$ that may be measured between adjacent electrodes in the 2-d array of electrodes responsive to activation of the coil(s) 221, 223. Those knowledgeable in the art and having benefit of the present disclosure would recognize that the arrangement of the coil(s) 221, 223 and the conductive member 203 forms a line source of current. The combination of the line source and a pair of electrodes may be viewed as a three terminal device. It should be noted that the current distribution of the line source as illustrated is not the same as that of an axially oriented transmitter, i.e., a dipole antenna.

From the measured potential differences, the following quantities indicative of the resistivity property of the earth formation may be calculated:

$$E = \sqrt{\left(\frac{\Delta V_1 + \Delta V_2}{2}\right)^2 + \left(\frac{\Delta V_3 + \Delta V_4}{2}\right)^2}, \quad (1).$$

$$\Delta E = \sqrt{(\Delta V_1 - \Delta V_2)^2 + (\Delta V_3 - \Delta V_4)^2} \text{ and}$$

$$\Delta E/E.$$

Figure 3A:
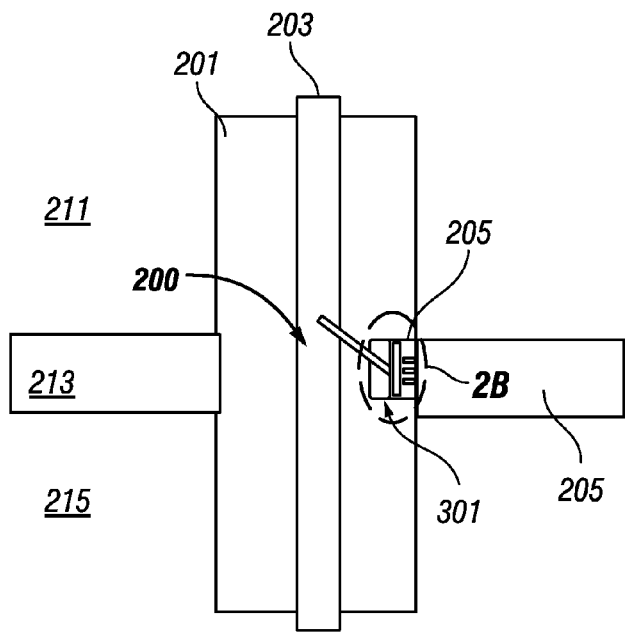
FIG. 3a shows an illustration of one embodiment of the present imaging tool suspended in a borehole with the line source on a pad.
Figure 3B:
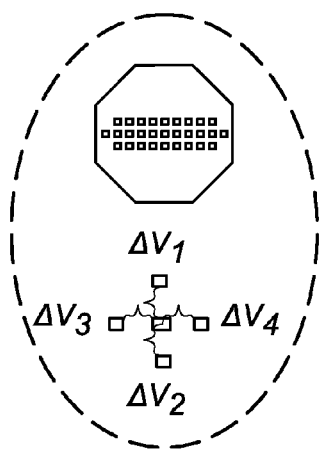
Figure 3C:
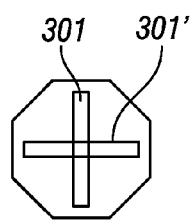
FIG. 3c shows an alternative embodiment of a pad of the imaging tool of FIG. 3a having an additional line source.
Figures 4A, 4B, 4C, 4D:
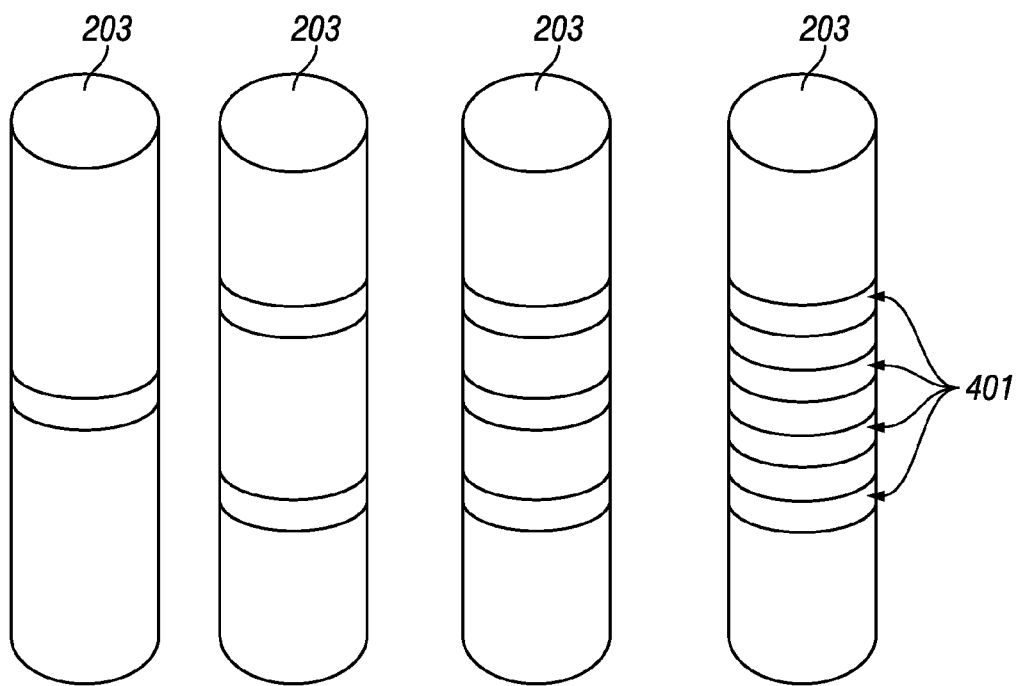
FIGS. 4a-d shows different configurations of a line source including toroidal coils on a conductive member.

FIGS. 3a-3c shows an alternate embodiment of the disclosure in which the line source is formed by a longitudinal metal rod with at least one toroidal coil 301 on the back of the sensor pad. The same quantities given by eqn. (1) can be measured. Due to the shorter length of the metal rod 301 compared to the rod 203, the standoff effects are larger, but the azimuthal resolution is improved. In an optional embodiment, and additional line source (transverse) 301' may be provided. When measurements are made responsive to activation of the longitudinal line source and the transverse source, it is possible to accurately determine the orientation of dipping beds and anisotropy. This is discussed in U.S. Pat. No. 7,365,545 to Itskovich et al., having the same assignee as the present disclosure and the contents of which are incorporated herein by reference.

Turning now to FIGS. 4a-4d, different line sources comprising a conductive member 203 and one or more toroidal coils 401 are illustrated. The more the number of toroidal coils, the better will be the line source.

FIGS. 5a-5b show an embodiment of the disclosure wherein only vertical measurements are made. As shown in FIG. 5b, two rows of electrodes are used. Consequently, only first differences in the vertical direction, denoted by $V_z$ are made in contrast to the plurality of differences possible with the electrode configuration of FIGS. 2 and 3.

Figure 6:
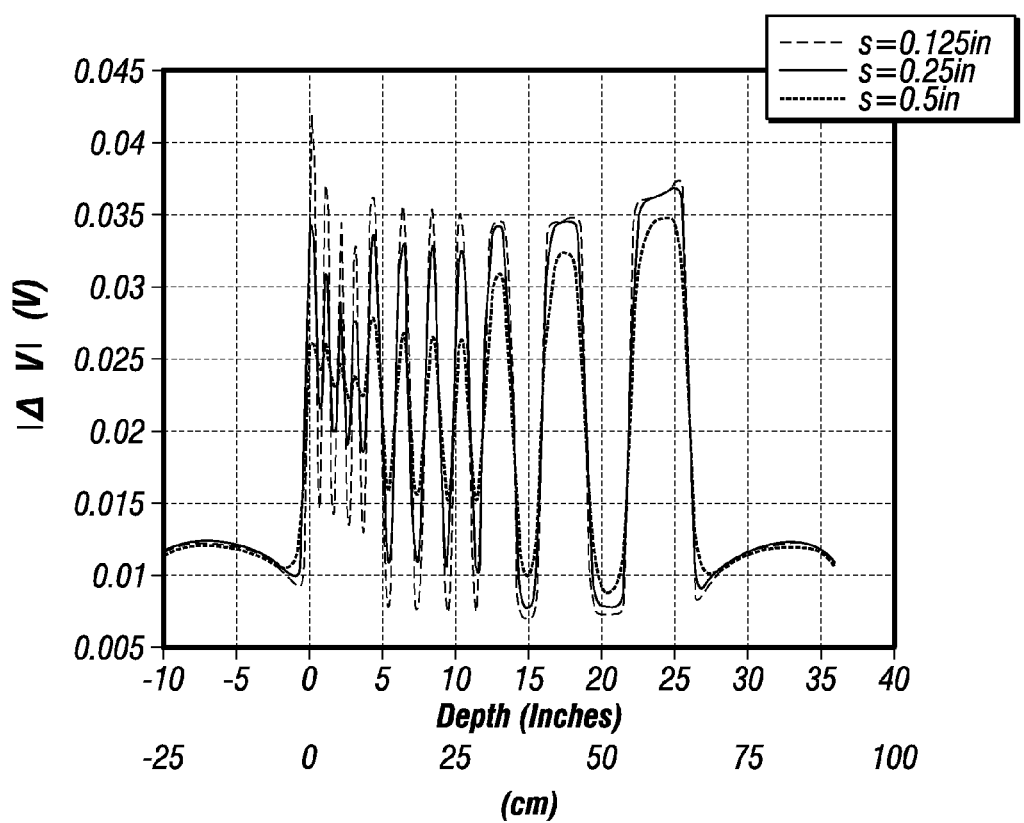
FIG. 6 shows a modeled response of the tool configuration of FIG. 5 as a function of bed thickness and tool standoff.

Modeling results with two receiver electrodes are used to obtain voltage difference and shown in FIG. 6. The spacing between two toroidal coils is 4 m. The pad and electrodes are expanded circumferentially to conform to a 2.5D forward modeling engine. A multiple layer model with different layer thickness from 0.5" to 4" (1.25 cm to 10 cm) is used to check the vertical resolution of the design. Also, different standoffs ranging from 0.125 in to 0.5 in. (3.125 mm to 12.7 mm) is used to check the standoff effects for the design. The results at 10 MHz are shown in FIG. 6 and show a good resolution of bed thickness even for a standoff of 12.7 mm.

The present disclosure has been made with respect to a wireline implemented device. It may also be adapted for an MWD embodiment using as the carrier a bottomhole assembly conveyed on a drillstring or coiled tubing. It may also be implemented for use on a slickline. It should be noted that for an MWD application, the contact member may be a stabilizer or a steering rib.

The device may be used to measure any resistivity property of the earth formation. This includes resistivity, conductivity, permittivity and dielectric constant.

The operation of the transmitter and receivers may be controlled by the downhole processor and/or the surface processor. Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to the specific embodiments of the disclosure, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
   a carrier including an inductively formed line source of electric current configured for capacitive coupling to the earth formation, the carrier configured to be conveyed in a borehole; and
   at least one pair of electrodes proximate to a wall of the borehole, a difference in potential between a first one of the at least one pair of electrodes and a second one of the at least one pair of electrodes being indicative of a resistivity property of the earth formation.

2. The apparatus of claim 1 wherein the inductively formed line source of electric current comprises a conductive member and at least one toroidal coil oriented along a longitudinal axis of the borehole, and wherein the inductively formed line source of electric current is further configured to provide current from the conductive member to the formation from locations distributed along the conductive member.

3. The apparatus of claim 2 wherein the at least one pair of electrodes are disposed on a contact member extendable from the carrier.

4. The apparatus of claim 2 wherein the at least one pair of electrodes further comprises an array of electrodes disposed on a contact member extendable from the carrier.

5. The apparatus of claim 4 wherein the line source of current is disposed on the contact member.

6. The apparatus of claim 5 further comprising an additional line source of current disposed on the contact member, the additional line source of current being inclined to the line source of current.

7. The apparatus of claim 1 further comprising a processor configured to use the difference in potential to estimate a value of the resistivity property.

8. The apparatus of claim 7 wherein the at least one pair of electrodes further comprises a first pair of axially separated electrodes and a second pair of electrodes inclined to the first pair of electrodes and wherein the processor is further configured to estimate the value of the resistivity property in two directions.

9. The apparatus of claim 1 further comprising a conveyance device configured to convey the carrier into the borehole, the conveyance device being selected from: (i) a wireline, (ii) a drillstring, (iii) coiled tubing, and (iv) a slickline.

10. The apparatus of claim 3 further comprising an additional inductively formed line source of current disposed on the contact member; wherein the carrier comprises a bottom hole assembly, and the conductive member comprises a drill pipe disposed on the bottom hole assembly.

11. A method of evaluating an earth formation, the method comprising:
    activating an inductively formed line source of electric current conveyed on a carrier in a borehole, the line source of electric current capacitively coupled to the earth formation; and
    providing a first signal from a first one of at least one pair of electrodes proximate to a wall of the borehole indicative of a potential of the first one of the electrodes and a second signal from a second one of the at least one pair of electrodes indicative of a potential of the second one of the electrodes; and using a processor for estimating a resistivity property of the earth formation using a difference in potential between the first signal and the second signal.

12. The method of claim 11 further comprising using, for the line source of electric current, a conductive member with at least one toroidal coil oriented along a longitudinal axis of the borehole, wherein the inductively formed line source of electric current is further configured to provide current from the conductive member to the formation from locations distributed along the conductive member.

* * * * *